Nov. 12, 1940.                    E. L. ROSE                    2,221,412
                              POWER TRANSMISSION
                              Filed May 26, 1937                2 Sheets-Sheet 1
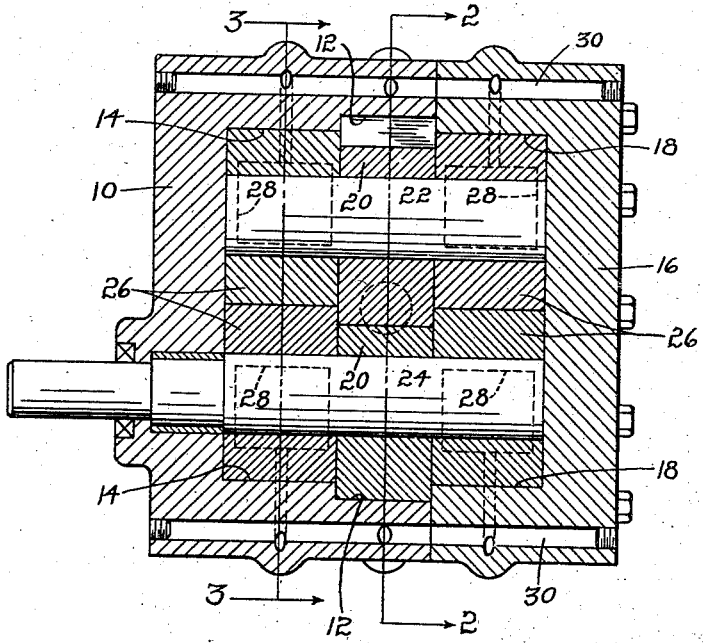
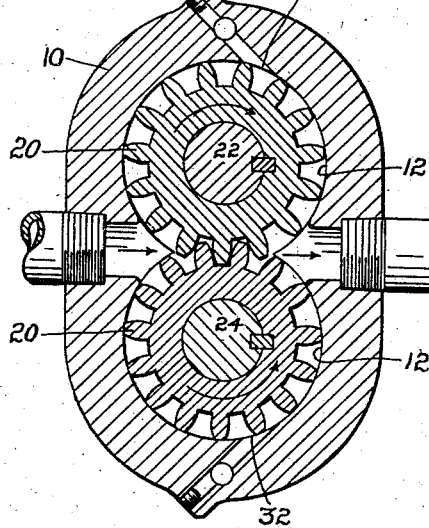
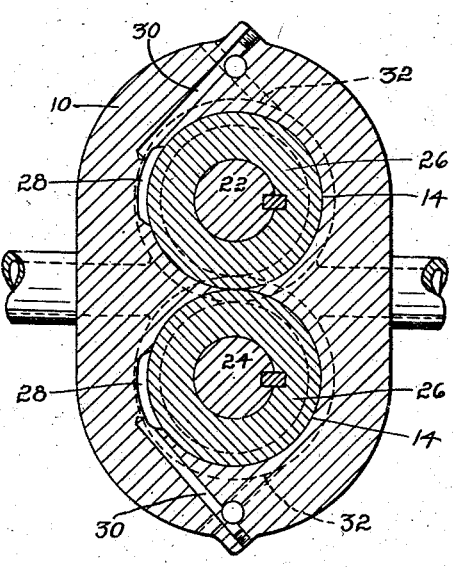
INVENTOR
EDWIN L. ROSE
BY
Ralph L. Tweedale
ATTORNEY Nov. 12, 1940.  E. L. ROSE  2,221,412

POWER TRANSMISSION

Filed May 26, 1937  2 Sheets-Sheet 2

INVENTOR
EDWIN L. ROSE
BY Ralph L. Tweedale
ATTORNEY

Patented Nov. 12, 1940

2,221,412

UNITED STATES PATENT OFFICE 2,221,412

POWER TRANSMISSION

Edwin L. Rose, Watertown, Conn., assignor to The Waterbury Tool Company, Waterbury, Conn., a corporation of Connecticut Application May 26, 1937, Serial No. 144,915

9 Claims. (Cl. 103—126)

This invention relates to power transmissions and more particularly to those of the type comprising two or more fluid pressure energy translating devices, one of which may function as a pump and another as a fluid motor. It is particularly concerned with such devices of the gear type wherein two or more gears are enclosed in intersecting cylindrical chambers provided with inlet and outlet conduits on opposite sides of the meshing point of the gears.

In the simple form of gear pump or motor comprising two gears only, many difficulties are encountered if it is attempted to operate such pumps at high pressure differentials between the inlet and outlet ports. This arises from the excessive radial fluid pressure forces exerted on the gears themselves and which must be counteracted on the gear shaft bearings. Various attempts have been made in the past to overcome these difficulties by attempts at balancing these forces but have so far met with little success. Pumps or motors of the gear type depend upon a very small clearance between the tips of the gear teeth and the circumferential wall of the gear chamber to maintain a seal between the inlet and outlet ports of the device. While this clearance is normally so small as to be of negligible consideration, it is nevertheless finite and must be properly controlled if reasonable efficiencies at high operating pressures are to be maintained. Previous attempts at counterbalancing the fluid pressure forces on the gears have entirely ignored variations in the running clearance from point to point around the circumference of a given gear, which variations, if permitted to occur, adversely effect the efficiency of the device.

It has been proposed in the past to provide a balanced gear pump or motor unit by the use of balancing chambers distributed around the circumference of each gear located diametrically opposite from the inlet and outlet ports, respectively, and cross connected to the same. This method of balancing entails a serious disadvantage in that the total arc around the gear in which the normal small running clearance exists is very small; in other words, the leakage path between adjacent points of high pressure and low pressure is extremely short. While high torque efficiencies may thus be obtained by this method of balancing, they are obtained at a great sacrifice of volumetric efficiency due to high leakage losses.

It has also been proposed to counterbalance gear type units by providing balancing areas on the gear shafts which are supplied with fluid at outlet pressure and are so located as to exert a resultant fluid pressure force in opposition to the resultant fluid pressure force exerted on the gears themselves. While such constructions permit a desirable long leakage path around the gear, they fail to provide for maintaining equal running clearance at all points around the gear. It is impossible in practice to so accurately design and manufacture such a balanced unit which would provide exact balance, there being always some resultant force tending to force the gear off center in its cylindrical chamber. Unless the gear is maintained absolutely central in its chamber, that is with an equal distribution of clearance around the gear, two serious difficulties are encountered which adversely effect efficiencies particularly at high pressures. The first is increased leakage and wear on the gear tooth outlines themselves due to improper meshing of the gears. The second is rapid wear occurring on the tooth tips and on the peripheral wall of the gear chamber, thus shortening the useful life of the unit and causing a progressively decreasing efficiency as the unit is subjected to use.

It is an object therefore of the present invention to provide a balanced gear type of hydraulic unit wherein the normal small running clearance between the gears and the peripheral walls of the chambers is maintained equally distributed around the gear, thus substantially entirely avoiding wear and insuring proper meshing of the gears.

Further objects and advantages of the present invention will be apparent from the following description, reference being had to the accompanying drawings wherein a preferred form of the present invention is clearly shown.

In the drawings:

Fig. 1 is a longitudinal cross section of a gear pump or motor incorporating one form of the present invention.

Fig. 2 is a cross section on line 2—2 of Fig. 1.

Fig. 3 is a cross section on line 3—3 of Fig. 1.

Figure 4:
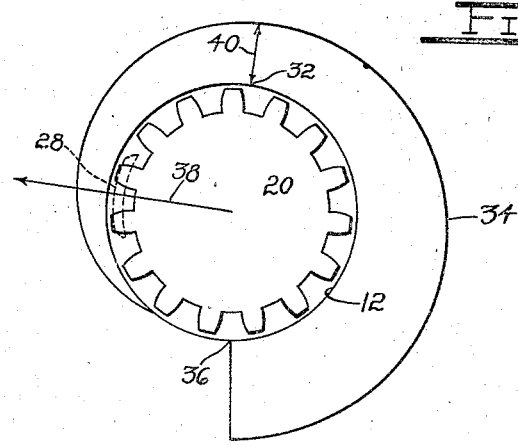
Fig. 4 is a pressure distribution diagram showing the pressure distribution around a gear with equally distributed running clearance.

Referring now to Fig. 1 there is provided a hydraulic unit comprising a housing member 10 having two intersecting cylindrical chambers 12 formed therein and a pair of smaller cylindrical chambers 14 connecting with the chambers 12. A cover member 16 is suitably attached to the housing member 10 and is provided with a pair of cylindrical chambers 18 corresponding in size and shape to the chambers 14. Within the chambers 12 there are mounted a pair of meshing gears 20 each of which carries a shaft 22 and 24. The shaft 24 is provided with an extension projecting through the housing to the left to provide a driving connection for the device. Rigidly secured to the shafts 22 and 24 on both sides of the gears 20 are pairs of sleeves 26 which form trunnions for the gears 20. Within the cylindrical walls of the chambers 14 and 18, which function as bearings for the trunnions 26, there are provided hollowed-out balancing chambers 28 which are in communication by conduits 30 with the chambers 12 at points 32, preferably 90° away from the centers of the balancing chambers 28.

Referring now to Fig. 4 the distribution of radial pressure around the gear 20 is indicated by the line 34. In this figure the radial distance from the circle 12, representing the gear chamber, to the line 34 indicates the pressure existing at any particular point around the periphery of the gear. For simplicity the drop has been assumed to be continuous although it will be understood that no drop occurs in the space between two tooth tips but the total drop is the sum of the drops occurring along the clearance between each tooth tip and the chamber 12. It will be seen that starting with the meshing point the pressure has a maximum equal to the discharge pressure. Continuing counterclockwise around the gear, the pressure stays at this value until the edge of the discharge port is reached. From this point on the pressure decreases until it is zero or inlet pressure at the edge of the inlet port. Whence it continues at zero to the meshing point.

If the resultant of all these radial forces acting on the gear be determined, it may be represented by a single force, such as the arrow 38. The balancing chambers 28, in the form of the invention illustrated in Figs. 1 through 3, are so positioned as to exert a force on the trunnions 26 acting along the line of the resultant 38 and in opposition thereto. The areas of the chambers 28 are so chosen as to produce a force exactly counterbalancing the force represented by the arrow 38 only when the chambers 28 are subjected to the pressure which exists in the chamber 12 at the point 32 when the clearance is equally distributed around the gear 20, as shown in Fig. 4, this pressure being indicated by the arrow 40.

Figure 5:
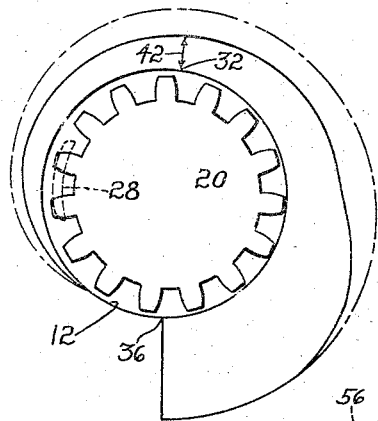
Fig. 5 is a pressure distribution diagram with the running clearance disposed entirely on one side of the gear.

Referring now to Fig. 5 which represents the pressure drop occurring around the circumference of the gear when the gear is eccentrically mounted in the chamber 12 so that the clearance is nearly zero at a point opposite the chamber 28, then it will be seen that the pressure in the chamber 28 is represented by the arrow 42 which is of much smaller value than the arrow 40. For a first approximation the resultant force on the gear under these conditions may be taken as substantially the same as arrow 38 in Fig. 4 so that this resultant force is able to overcome the greatly decreased pressure in chamber 28 and restore the gear to central position as illustrated in Fig. 4.

Figure 6:
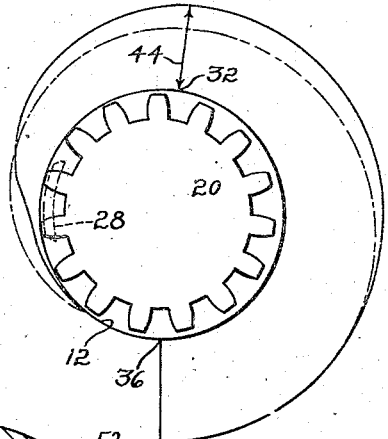
Fig. 6 is a pressure distribution diagram with the running clearance disposed entirely on the other side of the gear.

In Fig. 6 the arrow 44 represents the pressure at the point 32 when the gear is displaced with maximum clearance at a point opposite the balancing chambers 28. Under these conditions again assuming the resultant on the gear itself to be the same as in Fig. 4, there is a substantial restoring force in the opposite direction exerted at the chambers 28 to bring the gear back into central position.

Figure 7:
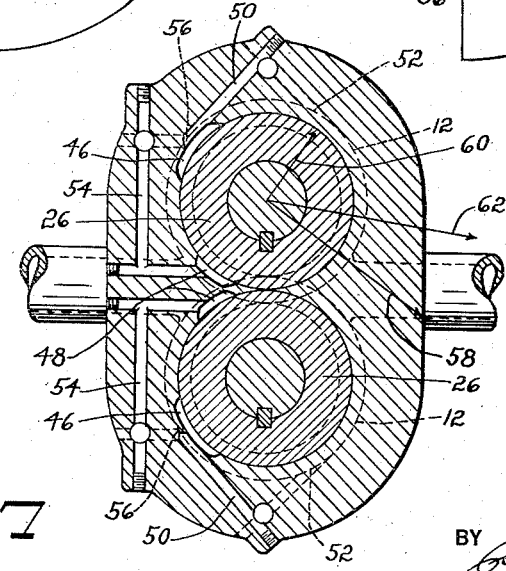
Fig. 7 is a view corresponding to Fig. 3 showing a second form of the invention.

For purposes of more adequately insuring the maintenance of equally distributed clearance and for taking into account the variations in the resultant force both in direction and amount which occur when the gear is displaced as in Figs. 5 and 6, the construction illustrated in Fig. 7 is preferred. In this form of the invention the construction is similar to that illustrated in Figs. 1 through 3 except that two sets of balancing chambers 46 and 48 are provided on the trunnions of each gear. The balancing chambers 46 are connected by conduits 50 to the chambers 12 at points 52 which are again preferably 90° beyond the center of the chambers 46 in the direction of rotation of the gears. Likewise, the chambers 48 are connected by conduits 54 to the chambers 12 at points 56, likewise 90° beyond the chambers 48. With this construction the arrow 58 represents the resultant force exerted by the chambers 46 on the trunnions 26 when the clearance is equally distributed while the arrow 60 represents the resultant force exerted by the chambers 48 on the trunnions 26 with the clearance equally distributed. The resultant of these two forces represented by the arrow 62 is in line with and of equal but opposite magnitude to the resultant force 38 of Fig. 4.

It will be seen that in this form of the invention the chambers 46 provide for centering the gear on the diameter through the arrow 58 while the chambers 48 center the gear on the diameter through the arrow 60. The gear is thus stabilized and kept absolutely central in the chamber 12 irrespective of the slight fluctuations which occur in the magnitude and direction of the resultant force on the gear teeth under conditions such as illustrated in Figs. 5 and 6.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of a housing having a pair of intersecting cylindrical chambers, a pair of intermeshing gears occupying said chambers and of a diameter to provide normal running clearance between the gear teeth and the chamber walls, a drive shaft connected to one of said gears, means forming inlet and outlet conduits for said device, and means including pressure balancing chambers communicating through the housing with points at the periphery of the gears and responsive to variations in the pressure gradient around the periphery of the gears for maintaining said running clearance substantially equal at all points around the gears.

2. In a fluid pressure energy translating device the combination of a housing having a pair of intersecting cylindrical chambers, a pair of intermeshing gears occupying said chambers and of a diameter to provide normal running clearance between the gear teeth and the chamber walls, a drive shaft connected to one of said gears, means forming inlet and outlet conduits for said device, and means responsive to variations in the pressure gradient around the periphery of the gears including balancing chambers located outside the first chamber and communicating with points at the periphery of the gears for maintaining said running clearance substantially equal at all points around the gears.

3. In a fluid pressure energy translating device the combination of a housing having a pair of intersecting cylindrical chambers, a pair of intermeshing gears occupying said chambers and of a diameter to provide normal running clearance between the gear teeth and the chamber walls, a drive shaft connected to one of said gears, bearing means for said gears, means forming inlet and outlet conduits for said device, and means including balancing chambers located at said bearing means for maintaining said running clearance substantially equally distributed around the gears, said balancing chambers communicating with the periphery of one of said gears at a point intermediate the inlet and outlet conduits.

4. In a fluid pressure energy translating device the combination of a housing having a pair of intersecting cylindrical chambers, a pair of intermeshing gears occupying said chambers, shafts extending on opposite sides of each of said gears, bearings formed in the housing for said shafts, inlet and outlet conduits for the device, balancing chambers formed in said bearings, and conduits extending between said balancing chambers and a point in said first chamber intermediate the inlet and outlet conduits.

5. In a fluid pressure energy translating device the combination of a housing having a pair of intersecting cylindrical chambers, a pair of intermeshing gears occupying said chambers, shafts extending on opposite sides of each of said gears, bearings formed in the housing for said shafts, inlet and outlet conduits for the device, balancing chambers formed in said bearings, and conduits extending between said balancing chambers and a point in said first chamber intermediate the inlet and outlet conduits, said shafts approximating the pitch diameter of the gears.

6. In a fluid pressure energy translating device the combination of a housing having a pair of intersecting cylindrical chambers, a pair of intermeshing gears occupying said chambers, shafts extending on opposite sides of each of said gears, bearings formed in the housing for said shafts, inlet and outlet conduits for the device, balancing chambers formed in said bearings, and conduits extending between said balancing chambers and a point in said first chamber intermediate the inlet and outlet conduits and substantially 90° away from the balancing chambers to which said conduits connect.

7. In a fluid pressure energy translating device the combination of a housing having a pair of intersecting cylindrical chambers, a pair of intermeshing gears occupying said chambers, shafts extending on opposite sides of each of said gears, bearings formed in the housing for said shafts, inlet and outlet conduits for the device, balancing chambers formed in said bearings, and conduits extending between said balancing chambers and a point in said first chamber intermediate the inlet and outlet conduits, said balancing chambers being so disposed on the periphery of said bearings and having sufficient area as to substantially counterbalance the resultant radial fluid pressure force on said gears only when the pressure at said point is that produced with substantially constant clearance around the periphery of said gears.

8. In a fluid pressure energy translating device the combination of a housing having a pair of intersecting cylindrical chambers, a pair of intermeshing gears occupying said chambers, shafts extending on opposite sides of each of said gears, bearings formed in the housing for said shafts, inlet and outlet conduits for the device, each shaft bearing being provided with two balancing chambers spaced approximately 90° apart, independent conduits communicating between each balancing chamber and a point in said first chamber substantially 90° away therefrom, said balancing chambers being so disposed on the periphery of each bearing and having sufficient area together to substantially counterbalance the resultant radial fluid pressure on the gears only when the peripheral clearance at the gear teeth is substantially equally distributed around the gear.

9. In a fluid pressure energy translating device the combination of a housing having a pair of intersecting cylindrical chambers, a pair of intermeshing gears occupying said chambers, shafts extending on opposite sides of each of said gears, bearings formed in the housing for said shafts, inlet and outlet conduits for the device, each shaft bearing being provided with two balancing chambers spaced approximately 90° apart, and means for supplying fluid to each balancing chamber at pressure dependent on the peripheral clearance of the gear teeth in a zone circumferentially displaced from the balancing chamber.

EDWIN L. ROSE.